United States Patent
Hess et al.

(10) Patent No.: US 11,231,296 B2
(45) Date of Patent: Jan. 25, 2022

(54) SYSTEMS AND METHODS FOR DETERMINING ROTATIONAL POSITION

(71) Applicant: Hamilton Sundstrand Corporation, Charlotte, NC (US)

(72) Inventors: Gary L. Hess, Enfield, CT (US); Kanwalpreet Reen, Phoenix, AZ (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/131,706

(22) Filed: Apr. 18, 2016

(65) Prior Publication Data

US 2017/0299409 A1 Oct. 19, 2017

(51) Int. Cl.
  *G01D 5/22* (2006.01)
  *G01D 5/20* (2006.01)

(52) U.S. Cl.
  CPC ......... *G01D 5/2291* (2013.01); *G01D 5/2073* (2013.01); *G01D 5/2086* (2013.01)

(58) Field of Classification Search
  CPC .............. G01R 27/2611; A61B 5/0031; A61B 5/02014; A61B 5/064; A61B 5/07
  See application file for complete search history.

(56) References Cited

U.S. PATENT DOCUMENTS

| | | | |
|---|---|---|---|
| 4,321,684 A | 3/1982 | Sommeria | |
| 4,352,050 A * | 9/1982 | Sakano | G08C 19/46 318/632 |
| 4,463,333 A * | 7/1984 | Ruhle | G01D 5/2066 336/115 |
| 4,556,885 A * | 12/1985 | Kurosawa | G05B 1/02 318/606 |
| 6,084,376 A * | 7/2000 | Piedl | G01D 5/2073 318/254.2 |
| 7,263,452 B2 | 8/2007 | Kawamura | |
| 7,436,173 B2 * | 10/2008 | Riedel | G01D 5/2291 324/207.18 |
| 7,817,070 B2 * | 10/2010 | Games | G01D 3/032 341/111 |

(Continued)

FOREIGN PATENT DOCUMENTS

| | | |
|---|---|---|
| EP | 2955488 A1 | 12/2015 |
| JP | 2011033602 A | 2/2011 |
| WO | WO-9964825 A1 | 12/1999 |

OTHER PUBLICATIONS

The extended European search report from the European Patent Office dated Sep. 29, 2017, for Application No. EP17166780.1.

*Primary Examiner* — Jermele M Hollington
*Assistant Examiner* — Suresh K Rajaputra
(74) *Attorney, Agent, or Firm* — Locke Lord LLP; Scott D. Wofsy; Georgi Koronbanov

(57) ABSTRACT

A resolver system includes a rotatable primary winding, a secondary winding fixed relative to the primary winding, and an analog-to-digital converter electrically connected to the secondary winding. A control module is operatively connected to analog-to-digital converter and is responsive to instructions to apply an excitation voltage with an oscillating waveform to the primary winding, induce a secondary voltage using the secondary winding using the excitation voltage, and acquire a plurality of voltage measurements from the secondary winding separated by a time interval corresponding to $\pi/3$ of the excitation voltage oscillating waveform.

16 Claims, 2 Drawing Sheets

(56) References Cited

U.S. PATENT DOCUMENTS

| | | | |
|---|---|---|---|
| 7,977,936 B2 | 7/2011 | Lillestolen et al. | |
| 9,068,861 B2 | 6/2015 | O'Neil | |
| 2002/0152039 A1* | 10/2002 | Fujimoto | B62D 5/046 |
| | | | 702/36 |
| 2005/0216218 A1* | 9/2005 | Kawamura | G01D 5/244 |
| | | | 702/95 |
| 2015/0160050 A1 | 6/2015 | Kamiido | |
| 2015/0276373 A1 | 10/2015 | Ide et al. | |
| 2015/0365099 A1 | 12/2015 | Saloio et al. | |

* cited by examiner

SYSTEMS AND METHODS FOR DETERMINING ROTATIONAL POSITION

BACKGROUND OF THE INVENTION

1. Field of the Invention

The present disclosure relates to rotating machinery, and more particularly to determining the rotational position of rotating components in rotating machinery.

2. Description of Related Art

Resolvers are commonly used to determine the rotational position of rotating components in rotating machinery. For example, resolvers are oftentimes associated with starter motor generators and actuators in aircraft to provide feedback regarding the state of the actuator, e.g., whether the actuator is open, partially open, or closed. A typical resolver includes an excitation coil carried by a rotating component and rotatable relative to first and second secondary coils positioned 90-degrees out of phase with one another. A sinusoidal excitation signal supplied to the excitation coil induces corresponding output signals in the first and second secondary coils. By comparing the phase of the excitation signal to the phase of the output signals, the orientation or position of the excitation coil can be determined.

In some applications, such as in high speed rotating machinery, the resolver output signals need to be sampled at rates that can approach the excitation frequency of the resolver. Since many resolver algorithms require a full sinusoid of the waveform to determine the shaft position or additional filtering as in full wave rectification, rotational position determination may be delayed or erroneous when rotational speed changes.

Such conventional methods and systems for determining rotational position have generally been considered satisfactory for their intended purpose. However, there is still a need in the art for improved resolvers, resolver interfaces, and methods of determining position using resolvers. The present disclosure provides a solution for this need.

SUMMARY OF THE INVENTION

A resolver system includes a rotatable primary winding, a secondary winding fixed relative to the primary, and an analog-to-digital converter (ADC) electrically connected to the secondary winding. A control module is operatively connected to the ADC and is responsive to instructions to apply an excitation voltage with an oscillating waveform to the primary winding, induce a secondary voltage using the secondary winding using the excitation voltage, and acquire a plurality of voltage measurements from the secondary winding separated by a time interval corresponding to $\pi/3$ of the excitation voltage oscillating waveform.

In certain embodiments, the control module can acquire secondary voltage measurements in synchronization with the period of the excitation voltage periodic waveform. The secondary voltage periodic waveform can be phase shifted relative to the excitation voltage periodic waveform. The control module can determine an RMS voltage of the secondary waveform between acquisition of the third secondary voltage measurement and end of the waveform period, such as with only three secondary waveform voltage measurements.

It is also contemplated that, in accordance with certain embodiments, the resolver system can include an excitation module electrically connected to the primary winding. An excitation module input lead can connect the control module to the excitation module. The control module can be operatively connected to the excitation module through the excitation module input lead to apply a sinusoidal voltage waveform to the primary winding. An ADC input lead can connect the control module to the ADC. The control module can be operatively connected to the ADC through the ADC input lead. A buffer can connect between the secondary winding and the ADC.

It is also contemplated that, in accordance with certain embodiments, the secondary winding can be a first secondary winding, and a second secondary winding can be fixed relative to the primary winding. The control module can be configured to acquire a three or more secondary voltage measurements separated by time intervals corresponding to $\pi/3$ of the excitation voltage periodic waveform from the second secondary winding. The ADC can be a first ADC, and a second ADC converter can be electromagnetically coupled between the primary winding and the control module. The primary winding can be fixed to a rotating component of a rotorcraft.

A method of determining rotational position of a rotating component includes applying an excitation voltage having a periodic waveform to a primary winding, inducing a secondary voltage having the same periodic waveform in a secondary winding using the excitation voltage, and acquiring a three or more secondary voltage measurements from the secondary winding. The voltage measurements are separated by time intervals corresponding to $\pi/3$ of the periodic waveform of the excitation voltage.

In certain embodiments, the secondary winding voltage measurements can be acquired in synchronization with the period of the excitation voltage periodic waveform. The periodic waveform of the secondary voltage is phase shifted relative to the periodic waveform of the excitation voltage. An RMS voltage of the secondary waveform can be determined between acquisition of the third secondary voltage measurement and end of the waveform period. The RMS voltage can be determined using only three measurement of the secondary waveform within one-half the period of the secondary waveform.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
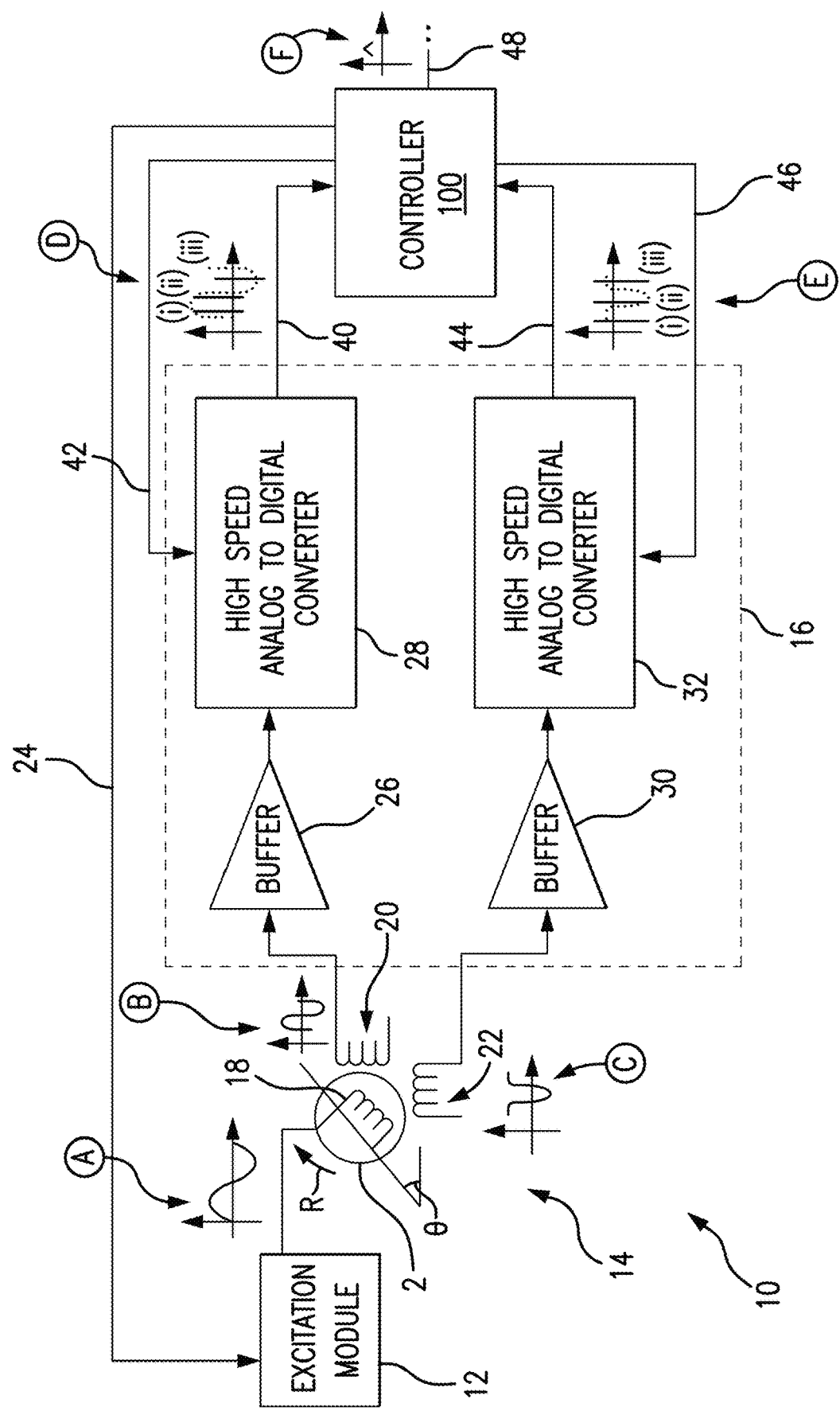
FIG. 1 is a schematic block diagram of an exemplary embodiment of a resolver system constructed in accordance with the present disclosure, showing a resolver coupled to a control module through a resolver interface.

Reference will now be made to the drawings wherein like reference numerals identify similar structural features or aspects of the subject disclosure. For purposes of explanation and illustration, and not limitation, a partial view of an exemplary embodiment of a resolver in accordance with the disclosure is shown in FIG. 1 and is designated generally by reference character 10. Other embodiments of resolvers in accordance with the disclosure, or aspects thereof, are provided in FIG. 2, as will be described. The systems and methods described herein can be used for determining linear position or rotational position of a rotating shaft, such as in linearly variable differential transfer (LVDT) or rotary variable differential transformer (RVDT) devices, though the present disclosure is not limited to LVDT or RVDT devices.

Referring to FIG. 1, an exemplary embodiment of an RVDT device, e.g., resolver 10, is shown. Resolver 10 includes an excitation module 12, a winding module 14, an interface module 16, and a control module 100 (also referred to as a controller). Winding module 12 includes a primary winding 18, a first secondary winding 20, and a second secondary winding 22. Primary winding 18 is fixed to a rotating component 2, which may be a shaft for an electric motor, and is electrically connected to excitation module 12. First secondary winding 20 and second secondary winding 22 are fixed relative to primary winding 18, and are electromagnetically coupled to primary winding 18. First secondary winding 20 and second secondary winding 22 are both connected to interface module 16.

Excitation module 12 is electrically connected to primary winding 18 and is configured and adapted to generate an excitation voltage of oscillating magnitude and period defined by control module 100. The frequency of the oscillating excitation voltage is determined by an input received from control module 100 through an excitation module input lead 24, which connects control module 100 with excitation module 12. In the illustrated exemplary embodiment excitation module 12 applies an excitation voltage to primary winding with a waveform A having a sinusoidal shape. The excitation voltage with waveform A induces a first secondary voltage with a corresponding waveform B in first secondary winding 20. The excitation voltage with waveform A also induces a second secondary voltage with a corresponding waveform C in second secondary winding 22. In the illustrated exemplary embodiment waveform B is a SINE waveform that may be offset in phase relative to waveform A. Waveform C is a COSINE waveform which is offset by 90-degrees from waveform B.

Interface module 16 includes a first buffer 26, a first analog-to-digital converter (ADC) 28, a second buffer 30, and a second ADC 32. First buffer 26 is electrically connected to first secondary winding 20 through a first buffer lead, and receives voltage waveform B therethrough. First buffer 26 is connected to first ADC 28, and provides voltage waveform B therethrough to first ADC 28, which acquires periodic voltage measurements therefrom according to a sampling scheme defined by control module 100.

Second buffer 30 is similar to first buffer 26 with the difference that second buffer 30 is connected to second secondary winding 22 through a second buffer lead, receives a voltage waveform C therethrough, and provides voltage waveform C to second ADC 32 through a second buffer output lead. Second ADC 32 acquires periodic voltage measurements voltage waveform C, also according to a sampling scheme defined by control module 100.

First ADC 28 is connected to control module 100 through an output lead 40 and an input lead 42. Based on a sampling scheme received from control module 100 through input lead 42, first ADC provides periodic voltage measurements D to control module 100 through output lead 40. Second ADC 32 is similar to first ADC 28 with the difference that second ADC 32 is connected to control module 100 through an output lead 44 and an input lead 46. Based on the sampling scheme received from control module 100 through input lead 46, second ADC 32 also provides periodic voltage measurements E to control module 100 through output lead 44. Control module 100 receives the voltage measurements D and voltage measurements E, and provides to an output lead 48 an RMS voltage F that corresponds to the rotational position, e.g., according to rotational speed R, of shaft 2.

The sampling scheme applied by control module 100 causes first ADC 28 and second ADC 32 to acquire at least three voltage measurements of voltage waveform B within one-half the period of waveform A. Each of the at least three voltage measurements is offset from another of the at least three voltage measurements by $\pi/3$ radians of one-half the period of waveform A. In this respect a first voltage measurement (i) occurs $\pi/3$ radians prior to a second voltage measurement (ii), and second voltage measurement (iii) occurs $\pi/3$ radians after second voltage measurement (ii). The sampling of waveform B by first ADC 28 is synchronized with waveform A. The sampling of waveform C by second ADC 32 is also synchronized with waveform A, and may further be simultaneous with sample of waveform B. Sampling the sinusoidal shape of waveform B at $\pi/3$ radians intervals allows for exact calculation of the RMS voltage of waveform B. The sampling is also accomplished prior to completion of the waveform period, allowing for rapid determination of the RMS voltage—advantageously allowing for both accurate and rapid determination of rotational position of shaft 2 during time intervals when the rotational speed of shaft 2 changes.

Acquiring at least three voltage measurements separated by time intervals corresponding to $\pi/3$ radians of one-half the period of waveform A from waveform B and waveform C also has the advantage that the RMS voltage determination is insensitive to any initial phase offset of waveform B and waveform C relative to waveform A. This is because of several key trigonometric identities that occur over intervals of $\pi/3$ radians, which render three-point RMS voltage determinations phase independent. In particular, the RMS voltage of waveform D and waveform E is given by Equation 1:

$$RMS = \sqrt{\frac{(V \cdot \sin(\phi))^2 + \left(V \cdot \sin\left(\frac{\pi}{3} + \phi\right)\right)^2 + \left(V \cdot \sin\left(\frac{2\pi}{3} + \phi\right)\right)^2}{3}}$$

where RMS is root-mean-square, V is voltage, and $\phi$ is phase shift.

Factoring out V gives Equation 2.

$$RMS = V\sqrt{\frac{(\sin(\phi))^2 + \left(\sin\left(\frac{\pi}{3} + \phi\right)\right)^2 + \left(\sin\left(\frac{2 \cdot \pi}{3} + \phi\right)\right)^2}{3}}$$

Using Equation 3

$\sin(x)^2 = \frac{1}{2} \cdot (1 - \cos(2x))$ gives Equation 4

$RMS = V$ $$\sqrt{\frac{\frac{1}{2}\cdot(1-\cos(2\phi))+\frac{1}{2}\cdot\left(1-\cos\left(\frac{2\cdot\pi}{3}+2\phi\right)\right)+\frac{1}{2}\cdot\left(1-\cos\left(\frac{4\cdot\pi}{3}+2\phi\right)\right)}{3}}$$

which simplifies to Equation 5

$$RMS = V\sqrt{\frac{\frac{3}{2}-\frac{1}{2}\cdot\left(\cos(2\phi)+\cos\left(\frac{2\cdot\pi}{3}+2\phi\right)+\cos\left(\frac{4\cdot\pi}{3}+2\phi\right)\right)}{3}}$$

Since one complete revolution of shaft 2 relative to cosine of a $2\pi$ scale is according to Equation 6:

$$\cos(2\cdot\pi+x)=\cos(x)$$

Which becomes by substitution Equation 7:

$$\cos\left(\frac{4\cdot\pi}{3}+2\phi\right)=\cos\left(2\pi-\frac{2\pi}{3}+2\phi\right)=\cos\left(-\frac{2\pi}{3}+2\phi\right)$$

RMS then becoming according to Equation 8:

$$RMS = V\sqrt{\frac{\frac{3}{2}-\frac{1}{2}\cdot\left(\cos(2\phi)+\cos\left(\frac{2\cdot\pi}{3}+2\phi\right)+\cos\left(-\frac{2\pi}{3}+2\phi\right)\right)}{3}}$$

Using Equation 9:

$$(\cos(x-y)+\cos(x+y))=2\cos(x)\cdot\cos(y)$$

Then Equation 10:

$$\left(\cos\left(\frac{2\cdot\pi}{3}+2\phi\right)+\cos\left(-\frac{2\pi}{3}+2\phi\right)\right)=2\cdot\left(\cos(2\phi)\cos\left(\frac{2\cdot\pi}{3}\right)\right)$$

Which becomes Equation 11:

$$\left(\cos\left(\frac{2\cdot\pi}{3}+2\phi\right)+\cos\left(-\frac{2\pi}{3}+2\phi\right)\right)=-\cos(2\phi)$$

Plugging Equation 11 into Equation 8 yields RMS voltage Equation 12:

$$RMS = V\sqrt{\frac{\frac{3}{2}-\frac{1}{2}\cdot(\cos(2\phi)-\cos(2\phi))}{3}} = V\cdot\sqrt{\frac{3}{2\cdot 3}} = V\cdot\sqrt{\frac{1}{2}}$$

It should be understood, that the above Equations can be implemented in digital logic or by a processor and involve computing in-phase and quadrature-phase resultants of the sampled resolver sine and cosine output signals of the resolver excitation signals. Further, it should also be noted that a computing device can be used to implement various functionality, such as that attributable to the method of digital demodulation and other functions performed by an FPGA. In terms of hardware architecture, such a computing device can include a processor, a memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The I/O devices that may be coupled to system I/O Interface(s) may include input devices, for example but not limited to, a keyboard, mouse, scanner, microphone, camera, proximity device, etc. Further, the I/O devices may also include output devices, for example but not limited to, a printer, display, etc. Finally, the I/O devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 2:
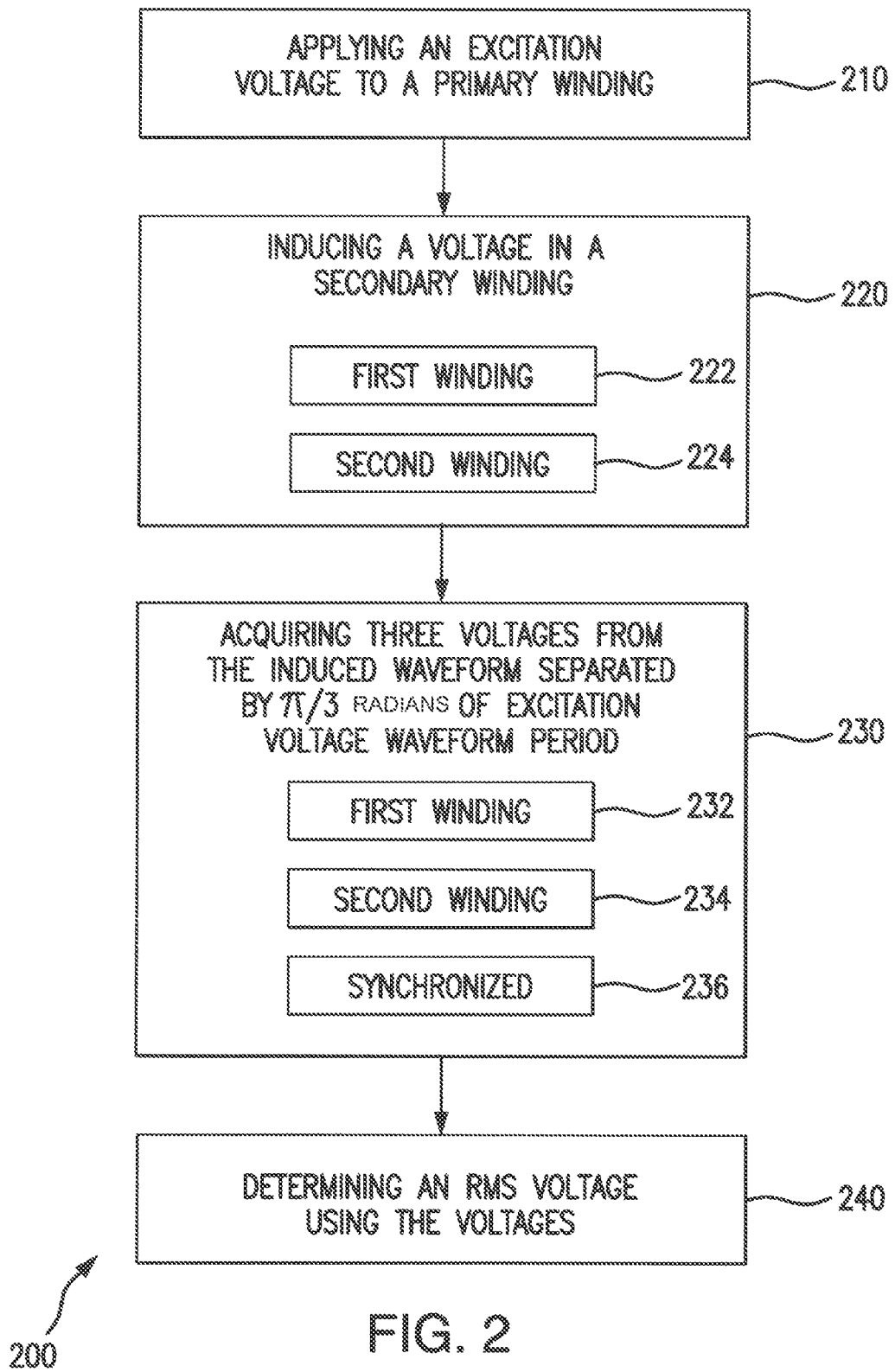
FIG. 2 is a schematic diagram of a method of determining rotational speed of a rotating component, showing the steps of the method.

With reference to FIG. 2, a method 200 of determining rotational position of a rotating component is shown. Method 200 includes applying 210 an excitation voltage having a periodic waveform to a primary winding, as shown with box 210. Method 200 also includes inducing a secondary voltage having a periodic waveform in a secondary winding using the excitation voltage, as shown with box 220. Inducing the secondary voltages can include inducing voltages in a first secondary winding, as shown with box 222, and in a second secondary winding, as shown with box 224. Three or more secondary voltage measurements can be acquired from the first and/or second secondary windings, shown with box 230, and an RMS voltage including positional information of the rotating element can be determined, as shown with box 240.

The methods and systems of the present disclosure, as described above and shown in the drawings, provide for resolvers with superior properties including the ability to determine the rotational position of a rotating element with one-half of the cycle of the excitation frequency of the resolver primary winding. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A resolver system, comprising:
a rotatable primary winding;
a secondary winding fixed relative to the primary winding;
an analog-to-digital converter electrically connected to the secondary winding; and
a control module operably connected to the analog-to-digital converter, the control module being configured to:
apply an excitation voltage having a periodic waveform to the primary winding;
induce a secondary voltage having a periodic waveform in the secondary winding using the excitation voltage; and
acquire three or more secondary voltage measurements separated within one-half a period of the periodic waveform of the excitation voltage corresponding to π/3 of one-half the period of the periodic waveform of the excitation voltage from the secondary winding, wherein a root mean square voltage determination is insensitive to an initial phase offset between the periodic waveform of the primary winding and the periodic waveform of the secondary winding, and wherein root mean square voltage determination is phase independent, and is defined by $$RMS = \sqrt{\frac{(V \cdot \sin(\phi))^2 + \left(V \cdot \sin\left(\frac{\pi}{3} + \phi\right)\right)^2 + \left(V \cdot \sin\left(\frac{2\pi}{3} + \phi\right)\right)^2}{3}}$$

where RMS is root-mean-square, V is voltage, and φ is phase shift.

2. A resolver system as recited in claim 1, wherein the control module is further configured to acquire secondary voltage measurements in synchronization with the period of the excitation voltage periodic waveform.

3. A resolver system as recited in claim 1, wherein the periodic waveform of the secondary voltage is phase shifted relative to the periodic waveform of the excitation voltage.

4. A resolver system as recited in claim 1, wherein the control module is further configured to determine an RMS voltage of the secondary waveform between acquisition of the third secondary voltage measurement and end of the waveform period.

5. A resolver system as recited in claim 1, wherein the control module is further configured to determine an RMS voltage of the secondary waveform using only three measurement of the secondary waveform within one-half the period of the secondary voltage waveform.

6. A resolver system as recited in claim 1, further comprising:
an excitation module electrically connected to the primary winding; and
an excitation module input lead connecting the control module to the excitation module, wherein the control module is operatively connected to the excitation module through the input lead.

7. A resolver system as recited in claim 1, further comprising:
an analog-to-digital converter input lead connecting the control module to the analog-to-digital converter, wherein the control module is operatively connected to the analog-to-digital converter through the analog-to-digital converter input lead.

8. A resolver system as recited in claim 1, further including a buffer connected between the analog-to-digital converter and the secondary winding.

9. A resolver system as recited in claim 1, wherein the secondary winding is a first secondary winding, and further comprising a second secondary winding fixed relative to the primary winding, wherein the control module is configured to acquire a three or more secondary voltage measurements separated within one-half a period of the periodic waveform of the excitation voltage corresponding to π/3 of one-half the period of the periodic waveform of the excitation voltage from the second secondary winding.

10. A resolver system as recited in claim 1, wherein the analog-to-digital converter is a first analog-to-digital converter, and further including a second analog-to-digital converter electromagnetically coupled between the primary winding and the control module.

11. A resolver system as recited in claim 1, wherein the primary winding is fixed to a rotating component of a rotorcraft.

12. A method determining rotational position of a rotating component, comprising:
applying an excitation voltage having a periodic waveform to a primary winding;
inducing a secondary voltage having a periodic waveform in a secondary winding using the excitation voltage; and
acquiring three or more secondary voltage measurements from the secondary winding separated within one-half a period of the periodic waveform of the excitation voltage corresponding to π/3 of one-half the period of the periodic waveform of the excitation voltage, wherein a root mean square voltage determination is insensitive to an initial phase offset between the periodic waveform of the primary winding and the periodic waveform of the secondary winding, and wherein root mean square voltage determination is phase independent, and is defined by $$RMS = \sqrt{\frac{(V \cdot \sin(\phi))^2 + \left(V \cdot \sin\left(\frac{\pi}{3} + \phi\right)\right)^2 + \left(V \cdot \sin\left(\frac{2\pi}{3} + \phi\right)\right)^2}{3}}$$

where RMS is root-mean-square, V is voltage, and φ is phase shift.

13. A method as recited in claim 12, wherein the acquiring includes acquiring the secondary voltage measurements in synchronization with the period of the excitation voltage periodic waveform.

14. A method as recited in claim 12, wherein the periodic waveform of the secondary voltage is phase shifted relative to the periodic waveform of the excitation voltage.

15. A method as recited in claim 12, further including determining an RMS voltage of the secondary waveform between acquisition of the third secondary voltage measurement and end of the waveform period.

16. A method as recited in claim 12, further including determining an RMS voltage of the secondary waveform using only three measurement of the secondary waveform within one-half the period of the secondary voltage waveform.

\* \* \* \* \*